(12) United States Patent
Huang

(10) Patent No.: US 11,514,322 B2
(45) Date of Patent: Nov. 29, 2022

(54) CNN-BASED DEMODULATING AND DECODING SYSTEMS AND METHODS FOR UNIVERSAL RECEIVER

(71) Applicant: Maxim Integrated Products, Inc., San Jose, CA (US)

(72) Inventor: Haiyu Huang, Dallas, TX (US)

(73) Assignee: Maxim Integrated Products, Inc., San Jose, CA (US)

( * ) Notice: Subject to any disclaimer, the term of this patent is extended or adjusted under 35 U.S.C. 154(b) by 120 days.

(21) Appl. No.: 16/994,811

(22) Filed: Aug. 17, 2020

(65) Prior Publication Data

US 2021/0027159 A1   Jan. 28, 2021

Related U.S. Application Data

(63) Continuation-in-part of application No. 16/934,676, filed on Jul. 21, 2020.
(Continued)

(51) Int. Cl.
*H04L 1/00* (2006.01)
*G06N 3/08* (2006.01)
(Continued)

(52) U.S. Cl.
CPC .............. *G06N 3/08* (2013.01); *G06K 9/6256* (2013.01); *G06N 5/046* (2013.01); *H04B 1/0003* (2013.01); *H04L 1/0045* (2013.01); *H04L 1/0061* (2013.01)

(58) Field of Classification Search
CPC ........ H04L 1/0045; H04L 1/0061; H04B 1/00
(Continued)

(56) References Cited

U.S. PATENT DOCUMENTS

| 11,200,487 | B1 | 12/2021 | Grundmann et al. |
| 2008/0144628 | A1* | 6/2008 | Tsai ..................... H04L 1/0054 370/392 |

(Continued)

OTHER PUBLICATIONS

Bishop Rock LLC Technical Intellignece, MAXM-2074P, Validity Search Report, "CNN Based Demodulating and Decoding Systems and Methods for Universal Receiver", dated Apr. 2020, (20 Pgs).
(Continued)

*Primary Examiner* — Emmanuel Bayard
(74) *Attorney, Agent, or Firm* — North Weber & Baugh LLP; Michael North

(57) ABSTRACT

Presented are systems and methods for automatically creating and labeling training data for training-based radio, comprising receiving, at a receiver, a frame that comprises a modulated radio frequency (RF) signal comprising a set of waveforms that correspond to payload data. The payload data comprises a sequence of random bits. In embodiments, until a stopping condition is met one or more steps are performed, comprising detecting the frame; demodulating the modulated RF signal to reconstruct the sequence of random bits; using the reconstructed sequence to determine whether the payload data has been correctly received; in response to determining that the payload data has not been correctly received, discarding it and, otherwise, accepting the sequence of random bits as a training label; associating the training label with the modulated RF signal to generate labeled training data; and appending the labeled training data to a labeled training data set.

6 Claims, 16 Drawing Sheets

Related U.S. Application Data

(60) Provisional application No. 62/879,330, filed on Jul. 26, 2019.

(51) Int. Cl.
  *G06N 5/04* (2006.01)
  *H04B 1/00* (2006.01)
  *G06K 9/62* (2022.01)

(58) Field of Classification Search
  USPC .................................. 375/316, 340, 341, 343
  See application file for complete search history.

(56) References Cited

U.S. PATENT DOCUMENTS

| | | | | |
|---|---|---|---|---|
| 2016/0204876 | A1* | 7/2016 | Kamura | H04J 14/0227 398/79 |
| 2016/0380792 | A1* | 12/2016 | Colavolpe | H04L 1/0061 375/316 |
| 2019/0274108 | A1* | 9/2019 | O'Shea | H04W 72/0453 |
| 2019/0288878 | A1 | 9/2019 | Shen et al. | |
| 2019/0319658 | A1 | 10/2019 | Calabro et al. | |
| 2019/0327463 | A1* | 10/2019 | Zhao | H04N 19/103 |
| 2019/0349228 | A1* | 11/2019 | Olsen | H04L 27/22 |
| 2020/0012895 | A1 | 1/2020 | Zhao et al. | |
| 2020/0143240 | A1 | 5/2020 | Baker | |
| 2021/0081754 | A1 | 3/2021 | Frolova et al. | |

OTHER PUBLICATIONS

Shop Rock LLC Technical Intellignece, MAXM-2074P, Infringement Report, "CNN Based Demodulating and Decoding Systems and Methods for Universal Receiver", dated Apr. 2020, (18 Pgs).

Eternat_Frame.png (323x992), Image captured from the Internet, <URL:https://upload.wikimedia.org/wikipedia/commons/7/72/Ethernet_Framepng>, (1 pg).

Artificial Intelligence Radio Transceiver (AIR-T), dated Jan. 2017, Analog Devices, available from the Internet, <URL:https://deepwavedigital.com/sdr>, (6 pgs).

LimeSDR Software Defined Radio, dated Jan. 2017, available from the Internet, <URL:https://limemicro.com/products/boards/limesdr>, (15 pgs).

Non-Final office action dated Feb. 2, 2022 in related U.S. Appl. No. 16/934,676, (10 pgs).

Non-Final office action response filed May 1, 2022 in related U.S. Appl. No. 16/934,676, (7 pgs).

Notice of Allowance dated Jul. 7, 2022 in related U.S. Appl. No. 16/934,676, (13 pgs).

* cited by examiner

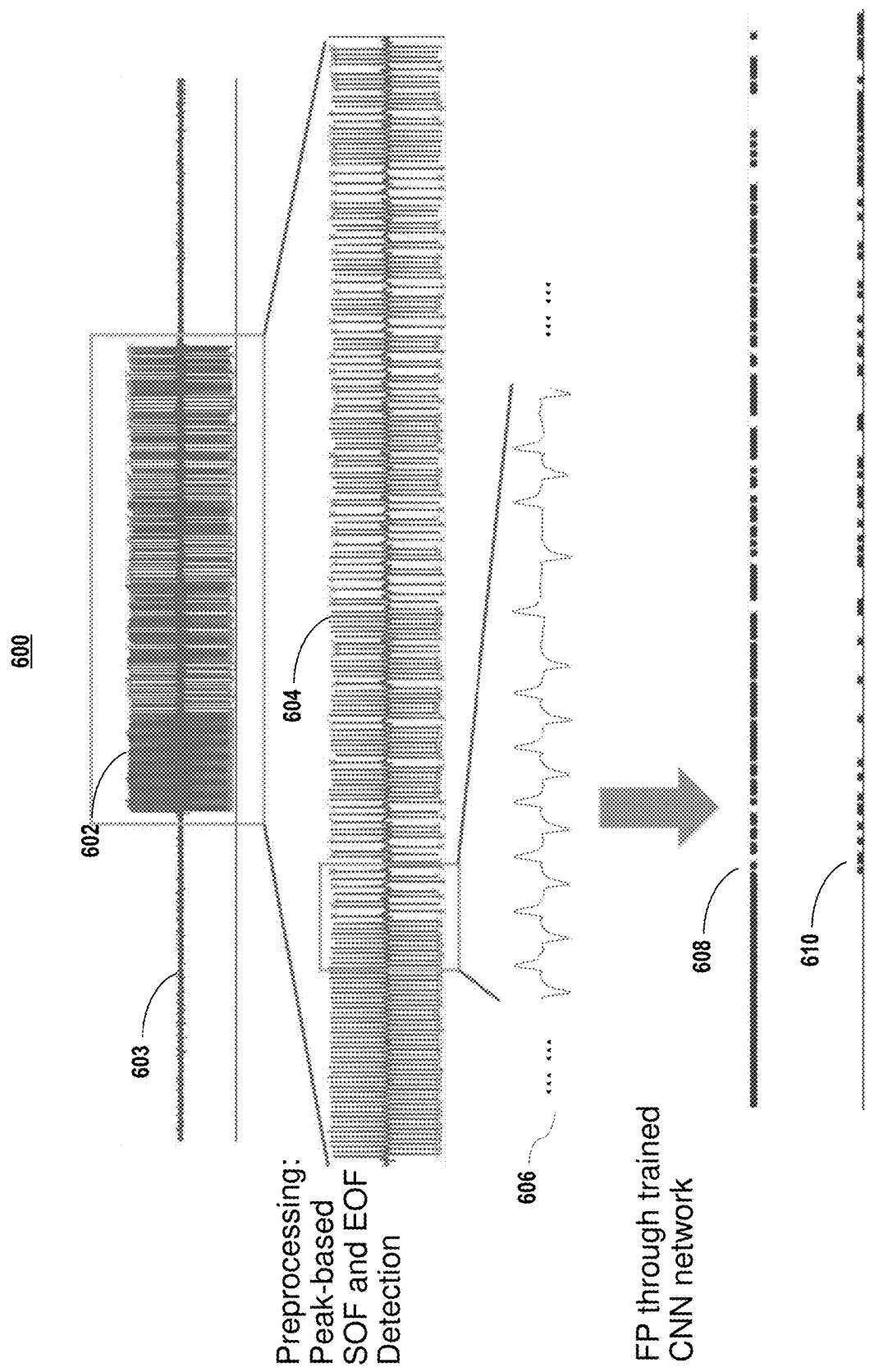

CNN-BASED DEMODULATING AND DECODING SYSTEMS AND METHODS FOR UNIVERSAL RECEIVER

CROSS-REFERENCE TO RELATED APPLICATION

This patent application is a continuation-in-part of U.S. patent application Ser. No. 16/934,676, filed on Jul. 21, 2020, entitled "CNN-Based Demodulating and Decoding Systems and Methods for Universal Receiver," listing Haiyu Huang as inventor, which claims priority benefit, under 35 USC § 119(e), to U.S. Provisional Pat. App. No. 62/879,330, filed on Jul. 19, 2019, entitled "CNN-Based Demodulating and Decoding Systems and Methods for Universal Receiver," listing Haiyu Huang as inventor. Each reference mentioned in this patent documents is incorporated by reference herein in its entirety and for all purposes.

BACKGROUND

The present disclosure relates generally to wireless communication systems and machine learning. More particularly, the present disclosure relates to signal processing for trainable universal radio, software defined radio, and smart radio.

In electrical communication systems that follow optimal receiver theory, a known input signal such as a modulated carrier signal can be better detected by a receiver that matches the received signal. A correlator, for example, may produce a matched filter by multiplying a received digitized waveform with a reference waveform and then digitally integrate the product. The optimal receiver that observes the input signal and random noise generated by various interference sources, algebraically adds (or multiplies) the two quantities to maximize the probability density (a sum of partial quantities) of the received input signal with respect to an attempted sequence. The noise is typically white Gaussian noise, which has a probability density that lends itself to conveniently carrying out calculations.

Radio applications typically utilize predetermined RF bands, common schemes for radio access, modulation, channel coding, data coding, and specific radio protocols to transmit, receive, and control wireless data traversing links in a radio network. To conform to the increasing number of protocols and modulation schemes, a decoder circuit in the receiver carries out convolutional decoding by using a number of fixed, predefined correlators when cross-correlating the received modulated signal with the reference waveform. Common receivers need to utilize separate, dedicated decoders that have predefined settings for each protocol and, oftentimes, for each modulation scheme. As a result, hardware cost, incompatibility issues, and complexity significantly increase with the increasing number of protocols and modulation schemes that need to be supported. For example, for radio communication, NFC has Type A, B, Felica®, MIFARE®, Vicinity, etc. Bluetooth also has several varieties; especially, the more customized modulation/encoding schedules, such as "ANT+," "Byrd," and "Anthena" by Gatekeeper, indicating a trend toward further diversification instead of conversion to a common standard. In fact, even within a single standard, such as Wi-Fi™, different scenarios may require different decoder hardware settings or manual intervention.

To accommodate the increasing number of different protocols and modulation schemes for different radio technologies, in an attempt to address the shortcomings of existing communication systems, one existing approach involves the concept of software defined radio (SDR) by moving some communication components, including the decoder, from a traditional hardware implementation to a software implementation on a computer or embedded system and control RF operating parameters such as frequency range, modulation type, output power, etc., by software. However, SDR is known to require fast and power-hungry processors, such as general-purpose CPUs for performing signal processing and decoding tasks, rendering this approach impractical for most communication applications.

This is exacerbated by the fact that, aside from the complexity involved therein, a conventional SDR demodulator requires various processing algorithms be programmed to detect and select different modulation schemes to demodulate a signal, e.g., by applying the selected demodulation algorithm according to a detected type of modulation or protocol, thereby, further increasing a system's memory requirements.

Accordingly, it would be desirable to have improved, low-cost decoding systems and methods that are suitable for training and using different protocols and modulation schemes, operate on low-power, and shorten design cycles.

BRIEF DESCRIPTION OF THE DRAWINGS

References will be made to embodiments of the disclosure, examples of which may be illustrated in the accompanying figures. These figures are intended to be illustrative, not limiting. Although the accompanying disclosure is generally described in the context of these embodiments, it should be understood that it is not intended to limit the scope of the disclosure to these particular embodiments.

FIG. 6 illustrates preprocessing of frame detection followed by CNN-based demodulation/decoding according to embodiments of the present disclosure.

DETAILED DESCRIPTION OF THE PREFERRED EMBODIMENTS

Figure 1:
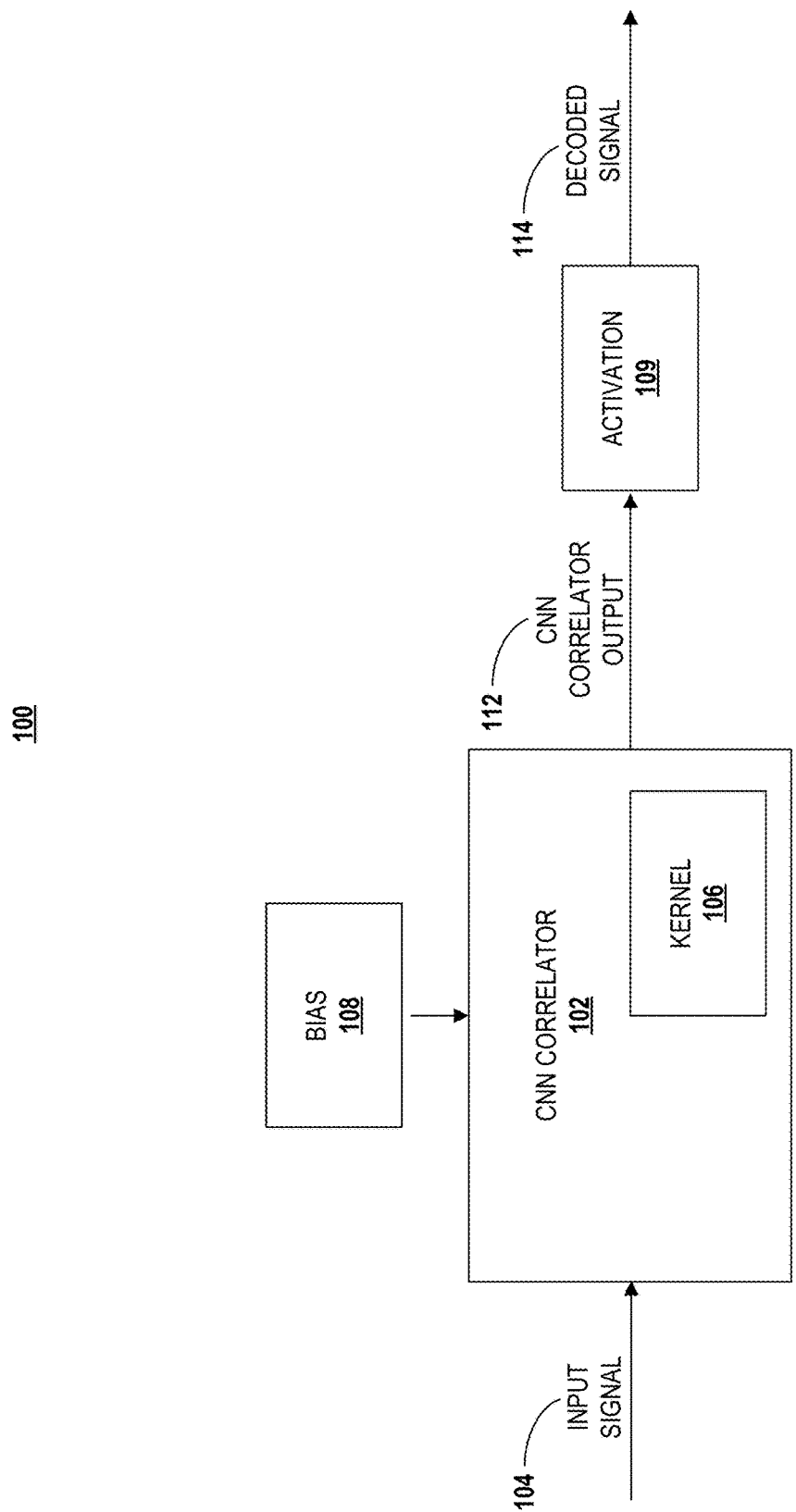
FIG. 1 illustrates a one-dimensional (1D) convolutional neural network (CNN)-based demodulator/decoder system for demodulating/decoding according to embodiments of the present disclosure.

In the following description, for purposes of explanation, specific details are set forth in order to provide an understanding of the disclosure. It will be apparent, however, to one skilled in the art that the disclosure can be practiced without these details. Furthermore, one skilled in the art will recognize that embodiments of the present disclosure, described below, may be implemented in a variety of ways, such as a process, an apparatus, a system/device, or a method on a tangible computer-readable medium.

Components, or modules, shown in diagrams are illustrative of exemplary embodiments of the disclosure and are meant to avoid obscuring the disclosure. It shall also be understood that throughout this discussion that components may be described as separate functional units, which may comprise sub-units, but those skilled in the art will recognize that various components, or portions thereof, may be divided into separate components or may be integrated together, including integrated within a single system or component. It should be noted that functions or operations discussed herein may be implemented as components. Components may be implemented in software, hardware, or a combination thereof.

Furthermore, connections between components or systems within the figures are not intended to be limited to direct connections. Rather, data between these components may be modified, re-formatted, or otherwise changed by intermediary components. Also, additional or fewer connections may be used. It shall also be noted that the terms "coupled," "connected," or "communicatively coupled" shall be understood to include direct connections, indirect connections through one or more intermediary devices, and wireless connections.

Reference in the specification to "one embodiment," "preferred embodiment," "an embodiment," or "embodiments" means that a particular feature, structure, characteristic, or function described in connection with the embodiment is included in at least one embodiment of the disclosure and may be in more than one embodiment. Also, the appearances of the above-noted phrases in various places in the specification are not necessarily all referring to the same embodiment or embodiments.

The use of certain terms in various places in the specification is for illustration and should not be construed as limiting. The terms "include," "including," "comprise," and "comprising" shall be understood to be open terms and any lists the follow are examples and not meant to be limited to the listed items. In this document, the term "decoding" refers to successfully recovering bits that have been encoded, e.g., at a corresponding transmitter.

It shall be noted that although embodiments described herein may be within the context of one-dimensional (1D) and two-dimensional (2D) CNNs, aspects of the present disclosure are not so limited. Accordingly, the aspects of the present disclosure may be applied or adapted for use in demodulating and decoding with multi-dimensional CNNs and other machine learning application. It shall also be noted that while examples are given in the context of supervised training model for CNNs, various embodiments may utilize other rule-based learning and machine learning techniques, such as unsupervised learning, reinforcement learning, support vector machines, Bayesian-tree models, hidden Markov models, and so on.

Any headings used herein are for organizational purposes only and shall not be used to limit the scope of the description or the claims.

General Introduction

Various embodiments herein leverage machine learning—a subfield of artificial intelligence (AI) that enables computers to learn on their own without being explicitly programed—to automatically decode and demodulate signals in a communication network.

Generally, machine learning architectures process neural network layers in an artificial neural network by using, e.g., a CNN. A CNN is a type of supervised network that allows solving complex classification or regression problems, such as performing image recognition tasks, which has led to their continually increased popularity. A CNN's convolution operations are computationally intensive and typically performed by CPU and GPU architectures not specifically designed or optimized to perform such operations efficiently. While recent high-computational-throughput processors with improved architectures have increased computing speed, no effort has been made in utilizing machine learning approaches for demodulator and decoder applications or in creating processors that are optimized for CNN architectures for implementation into communication systems.

Unlike conventional optimal receiver theory, which uses a number of fixed, predefined correlators that correlate a received signal against reference data, embodiments presented herein utilize, e.g., a 1D CNN as the key architecture of a decoder that utilizes one or more 1D convolution windows (or kernels) to perform convolution operations on a to-be-decoded or demodulated input signal that has been received. Systems and methods herein allow to efficiently perform linear algebra operations, such as matrix multiplications and related computations, utilized by complex algorithms, by reducing latency and power consumption, thereby, improving overall computational efficiency.

In embodiments, a CNN that comprises any number of layers and sub-layers may be implemented by electrical circuits that perform multiply-and-accumulate operations. The convolutional layers may compute a number of filters. As discussed in greater detail below, each filter may represent a feature that is common with labeled data in an input training data set. The CNN may then, in a subsequent inference phase, apply the so learned filters to new, unknown input signals in order to discern different features, such as zeroes and ones, by convolving the filter over the input signal according to embodiments of the present disclosure.

FIG. 1 illustrates a CNN-based decoder demodulator/decoder system for demodulating/decoding according to embodiments of the present disclosure. It is pointed out that system 100 is used only for demonstration purposes and ease of illustration. As depicted in FIG. 1, demodulator/decoder 100 comprises CNN correlator 102 that in response to receiving/detecting input signal 104, uses input signal 104 and convolution kernel 106 (or weights) to perform a number of convolutions. Input signal 104 received at CNN demodulator/decoder 100 may be a to-be-decoded modulated RF signal that comprises data that was unknown to CNN correlator 102 (i.e., for purposes of machine learning, unlabeled data) and may comprise any number of channels. Since commonly, two signals (channels I and Q) exist in a mixer downconversion-based radio communication receiver, in embodiments, in order to match the input signal, kernel 106 may have same number of channels as input signal 104. It is understood that the number of channels may be different from the number of CNN filters or kernels 106 used.

In embodiments, CNN correlator 102 may be implemented as a digital device that detects within input signal 104 the presence of replica of a pattern or sub-pattern, such as a discrete time domain sequence of finite-length. In embodiments, CNN correlator 102 determines the amount of correlation between corresponding bits in input signal 104 and kernel 106. Whenever input signal 104 and kernel 106 perfectly correspond to each other, the correlation is deemed maximal, thus, resulting in a maximal CNN correlator output 112. A partial correlation will result in a less than maximal correlator output 112, and a mathematical anti-correlation may result in a negative correlator output 112.

Kernel 106 may be implemented in a dedicated low-power neural processor or accelerator that, in embodiments, may be programmable. The decoding of input signal 104 may be implemented in hardware as neural processor.

In embodiments, CNN correlator 102 may use 1D convolution operations to generate output feature sequences for a given neural layer by using data in a 1D convolution window from a previous layer. In embodiments, each feature point in the output feature sequence may be the weighted sum of the input data with all input channels that may be passed through a nonlinear activation function.

In embodiments, prior to applying activation 109 (e.g., a non-linear activation function) to generate decoded signal 114, trainable bias 108 may be added to the weighted sum to generate CNN correlator output 112. The convolution window may be moved by a given stride to produce the next feature point reapplying (i.e., reusing the same calculation circuits) the same weights to the next convolution window, thus, taking advantage of weight-sharing with convolution neural networks, unlike a fully connected neural network.

It is understood that proper amount of padding may be applied to the input data, and proper CNN hyperparameters, such as filter size, stride, and number of convolution layers may be used as a deep CNN to generate output data with desired sequence size, which is typically the number of desired received data in a communication frame.

In embodiments, CNN correlator 102 may use 2D convolution operations to generate output feature maps for a given layer by using data in a 2D window from a previous layer. In embodiments, each feature point in the output feature map may be the weighted sum of the input data that may be passed through a nonlinear activation function unit 109 and a trainable bias may be added to the weighted sum prior to applying an activation function.

In embodiments, activation 109 may utilize hardware accelerators (not shown) to obtain output signal 114. In embodiments, activation 109 may operate in the analog domain and may use a relatively simple activation function, such as ReLU.

Similarly, bias 108 may be utilized, for example, as an offset to input signal 104, a digital offset, a digital adder to CNN output 112, an offset inside activation 109, or a separate weight item, e.g., with a corresponding fixed data item representing the value 1.

In embodiments, the convolution window may then be moved by a given stride to produce the next feature point reapplying the same weights to the next convolution window, again, to take advantage of weight-sharing.

In embodiments, the input signal, which in communication applications is typically 1D data sequence, may be converted into a 2D, image-like signal suitable for being processed by a 2D CNN. It is understood that, as with 1D embodiments, the proper amount of padding may be applied to input data, and CNN hyperparameters may be used as a deep CNN to generate output data with desired sequence size.

In embodiments, filter results from a convolutional layer may be summed and output into a subsequent pooling layer that may perform subsampling operations, e.g., to reduce output map dimensions of the preceding convolutional layer.

It is understood that convolutional layer operations and pooling layer operations may be applied any number of times and in any order (e.g., a pooling layer may be applied before a convolution layer), until a predefined stop condition has been reached. This may be followed by a fully connected layer that may be used to perform pattern detection. Finally, the CNN correlator output of the overall multi-layer neural network may be tested, e.g., in real-time operation to determine whether a zero or one has been successfully recognized, such as to gain insight to information contained in a communication frame of the communication signal, and the like. In embodiments, as a last-step decoding process, data values from the last CNN layer may be collected, e.g., by software, and used directly or the data values may serve as input for a classification function, such as zeroes or ones in activation 109 that are then output as output signal 114.

In embodiments, convolve kernels of a 1D or multi-dimensional CNN may utilize labeled training sequence of receiver signals as input to learn zeroes and ones. In embodiments, the weights of a convolve window may be trained in batch, or in real-time in an on-line training fashion, e.g., where a customer feeds real-time testing signals through the internet. It is noted that the trained network may then be fine-tuned, e.g., iteratively, to learn additional features. In effect, this self-optimizes the convolve kernels to automatically decode the received communication signals in real-time.

In embodiments, training of CNN 102 may be implemented in software, e.g., by using a more powerful processor than for inference. To train decoder system 100, labeled decoding results may be used as inputs 104 for CNN 102. It is understood that, in embodiments, training may begin with a default (e.g., random or pseudorandom) kernel that may be modified over time. In embodiments, supervised learning may be employed, e.g., to distinguish different symbol patterns or sub-patterns, e.g., zeroes and ones.

For example, for protocols that comprise a known sequence of symbols, e.g., a fixed 8-byte preamble that comprises 0s and 1s, some or all of such sequence may be utilized as a training set. It is understood that, in embodiments, the length of a suitable preamble that may serve as a predetermined labeled training set, ideally, is not too short to be useful for training purposes. The training preamble, as well as neural network hyperparameters, e.g., stride, may be determined by various factors, such as sample rate or data rate, type of neural network, and the like.

It is envisioned that new protocols may be developed or existing ones modified to enable such training on a preamble, e.g., in a dedicated training mode before actual data communication commences in a regular mode. In embodiments, trainability advantageously eliminates the need to separately define and implement kernels for each individual modulation scheme and scenario.

Once training (learning) is completed, in an inference (prediction) phase, CNN correlator 102 may use unsupervised operations to detect or interpolate previously unseen sequences in new input data, e.g., to demodulate and decode the sequence into zeroes and ones, or other forms of desired information, in real-time.

Unlike conventional demodulators or decoders, the approach of retraining CNN-based demodulator/decoder 100 to adapt to changing scenarios and communication protocols without having to design new generation hardware products significantly reduces design time and cost for future communication technologies and facilitates easy upgrades.

It is understood that system 100 and its components illustrated in FIG. 1 are not limited to the constructional detail shown there or described in the accompanying text. For example, as those skilled in the art will appreciate, CNN correlator 102 may be implemented many different ways and comprise any number of hidden network layers. Similarly, activation unit 109 may utilize a wide variety of activation functions circuits, such as Leaky ReLU and sigmoid.

Figure 2A:
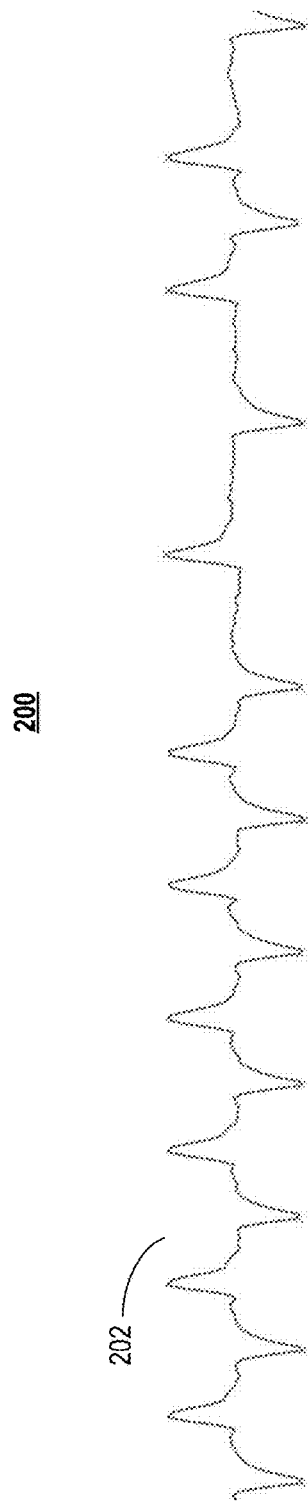
FIG. 2A illustrates an exemplary receiver input signal in the time-domain.

FIG. 2A illustrates an exemplary receiver input signal in the time-domain. In optimal receiver theory, $$r(t) = \int_0^t f(\tau) s(\tau) d\tau \quad \text{(Eq. 1)}$$

in the time domain, where r(t) is the output signal at time t; and $s(\tau)$ and $f(\tau)$ are input signal 202 (e.g., a to-be-decoded modulated signal that contains noise, distortion, and interference from wireless communication) and the correlator, respectively, at time $\tau$. Conventionally, correlator $f$ is a fixed predesigned function that is typically hardcoded in a digital demodulator that requires a different $f$ for each different type of signal, e.g., a Bluetooth LE signal.

In contrast, in embodiments, a convolution step in a 1D CNN uses:

$$r(kT_s) = \Sigma_{n=k-p}^{k} W(nT_s) s(nT_s) \quad \text{(Eq. 2)}$$

in the discrete time domain, where $r(kT_s)$ represents the output signal at discrete time $kT_s$; $s(nT_s)$ and $W(nT_s)$ represent the respective input signal 202 and weight function 252, i.e., the convolve window of the CNN (kernel), at time n $T_s$; and p represents the number of samples that each symbol period contains.

In embodiments, a convolution layer in the 1D CNN uses:

$$a_j(kT_s) = act(\Sigma_{i=1}^{c} \Sigma_{n=k-p}^{k} W_i(nT_s) s_i(nT_s) + b) \quad \text{(Eq. 3)}$$

where $a_j$ is the output of filter j (j=1, 2, 3 ... l), where l represents the number of filters in that layer), c represents the number of channels of the input signal, b is the bias, and act represents a nonlinear activation function.

It is noted that unlike the correlator in Eq. 1, kernel $W(nT_s)$ is not a fixed function. It is further noted that, in embodiments, receiver input signal 202 may be a downconverted signal, such as the output of an analog mixer that mixes a modulated carrier signal to a lower frequency. A signal of interest may then be detected in the lower frequency signal, or demodulated digital waveform, by correlating it, e.g., with an appropriately trained kernel.

In embodiments, 1D input signal 202 may be an input string of data that, e.g., in an intermediate step, may be folded into a 2D (e.g., square) input signal (not shown in FIG. 2A), which is commonly used for image processing, or an even larger 3D CNN, such that 1D input string of data may be processed through a 2D or 3D CNN kernel to be decoded. In embodiments, this may be accomplished by reconstructing 1D input signal 202 in a manner such as to fit the size and shape of the multi-dimensional CNN kernel.

It is understood that the concept of "folding" may be equally applied to any N-dimensional input and neural network.

Figure 2B:
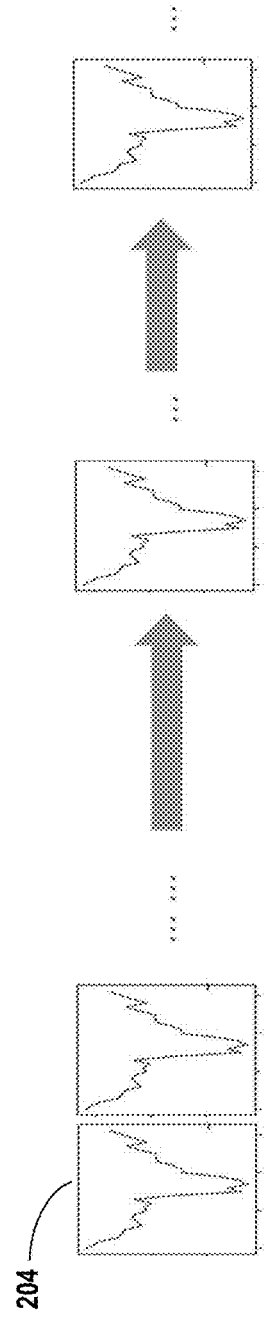
FIG. 2B illustrates the application of an exemplary correlator to the receiver input signal in FIG. 2A.

FIG. 2B illustrates the application of an exemplary correlator to the receiver input signal in FIG. 2A. It is noted that FIG. 2A and FIG. 2B are shown for illustrative purposes to visualize and increase understanding of the presented concepts. Although a time-domain input signal is shown in FIG. 2A, it is understood that correlator 102 may be implemented to correlate, process, and compare other types of signals.

Signal $s(\tau)$ 202 in FIG. 2A represents an input waveform as it may be received by a receiver. The waveforms 204 in FIG. 2B represent a correlator or kernel for the CNN. In embodiments, a correlator comprising a 1D CNN convolves the two waveforms that are to be correlated, e.g., using a stride (i.e., interval or step size that kernel 106 moves per output computation) and window size both equal to the number of samples in a period p. In embodiments, the convolution window identifies characteristics, here zeroes and ones, at various locations in input signal 202. The correlator may output a convolution result that represents how closely input kernel 106 matches signal 104, a large output indicating a high degree of correlation, a small sum indicating a low degree of correlation, and, in the case of the input being maximally unmatched, even negative correlation (anti-correlation).

In embodiments, input signal 202 comprises one or more channels that match the number of channels in a CNN filter, and one or more filters may share the same set of kernels 204, reusing kernel 204, to increase utilization of computational resources, such as storage space and computation time.

Figure 3:
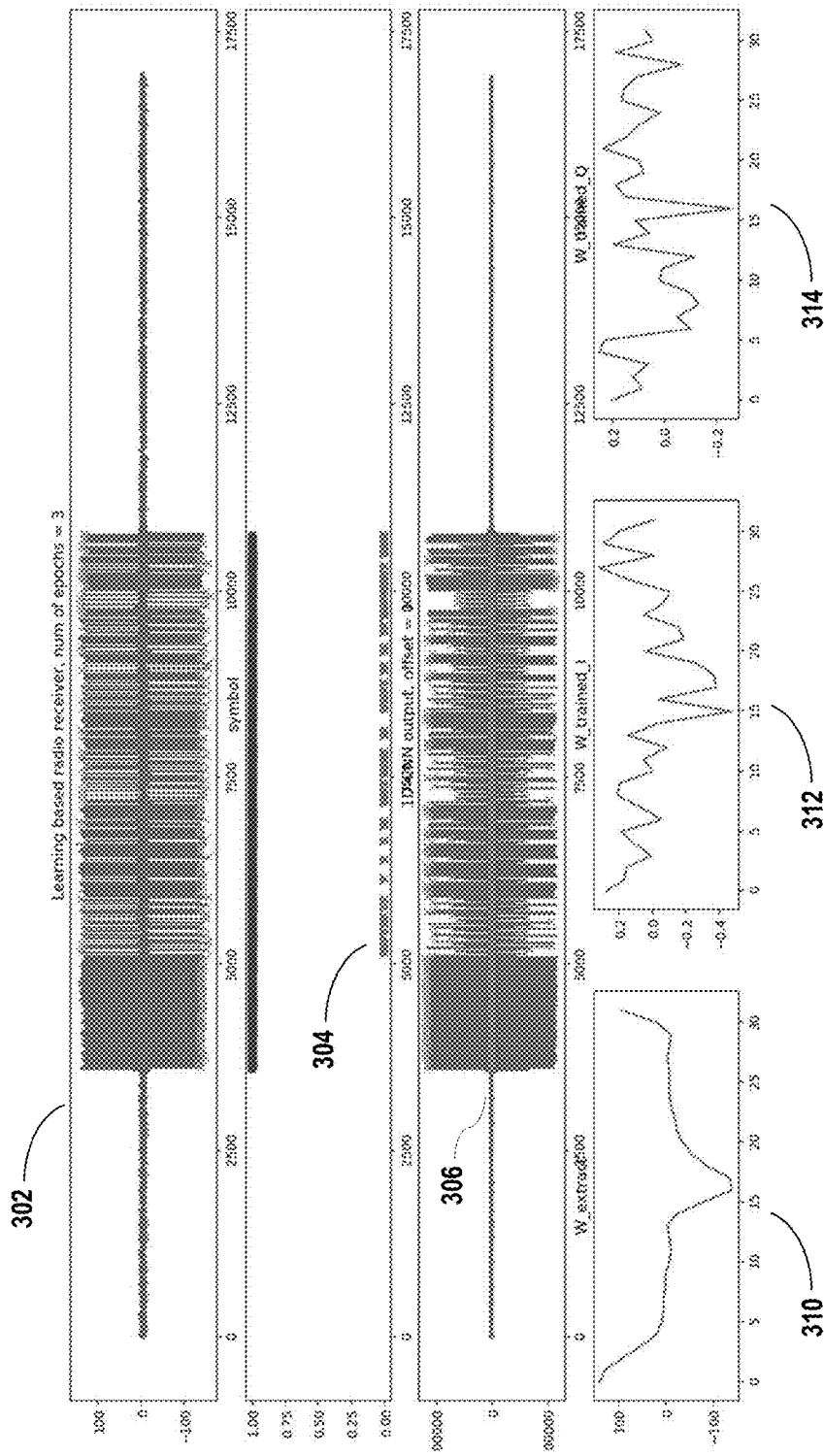
FIG. 3 illustrates the effect of training CNN kernels to decode a received signal that follows a certain protocol, according to embodiments of the present disclosure.

FIG. 3 shows simulation results that illustrate the effect of training CNN kernels to decode a received signal that comprises two channels, I (shown as 302) and Q (not shown). It is noted that all examples, values, and results herein are provided by way of illustration and were performed under specific conditions using a specific embodiment or embodiments. Accordingly, neither these experiments nor their results shall be used to limit the scope of the disclosure of the current patent document.

The received signal 302 in FIG. 3 follows a certain protocol according to embodiments of the present disclosure. In this example, exemplary CNN kernel channels 312, 314 are optimized for decoding an NFC signal of the Felica® protocol. In embodiments, CNN kernel channels 312, 314 are automatically constructed and "self-optimized" after having been trained for, example with real analog-to-digital convertor data samples obtained by an NFC receiver from communicating with actual Felica® cards.

The CNN kernels depicted in FIG. 3, have undergone 3 epochs of training.

In embodiments, training may involve a supervised training process that may be executed on a different, powerful processor that may use a gradient decent process based on cost-function minimization. As indicated by the triangles in signal 304 in FIG. 3, resulting signal 304 still contains relatively many decoding errors after the 3-epoch training.

Figure 4:
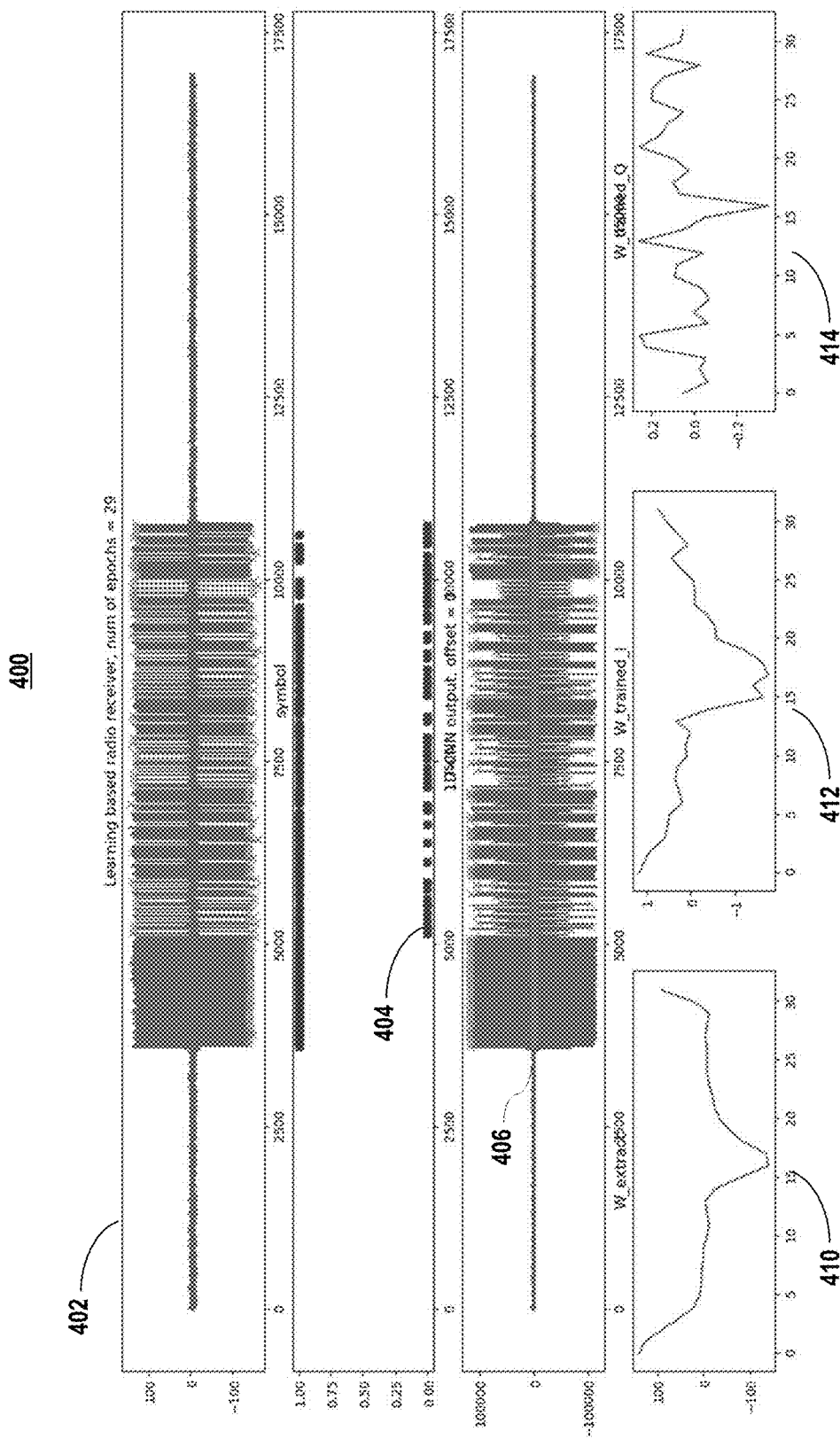
FIG. 4 illustrates the effect of additional training on the CNN kernels used in FIG. 2.

FIG. 4 illustrates the effect of additional training on the exemplary CNN kernels used in FIG. 3. The CNN kernels depicted in FIG. 4, have undergone 29 epochs of training. As shown, resulting signal 404 no longer contains decoding errors, and the better trained CNN kernel 414, 416 closer resembles to optimal kernel 410.

Advantageously, systems according to embodiments of the present disclosure that utilize a dynamically trainable kernel, which may be re-trained and upgraded to accommodate different scenarios, greatly saves design time, including simulation time.

Figure 5A:
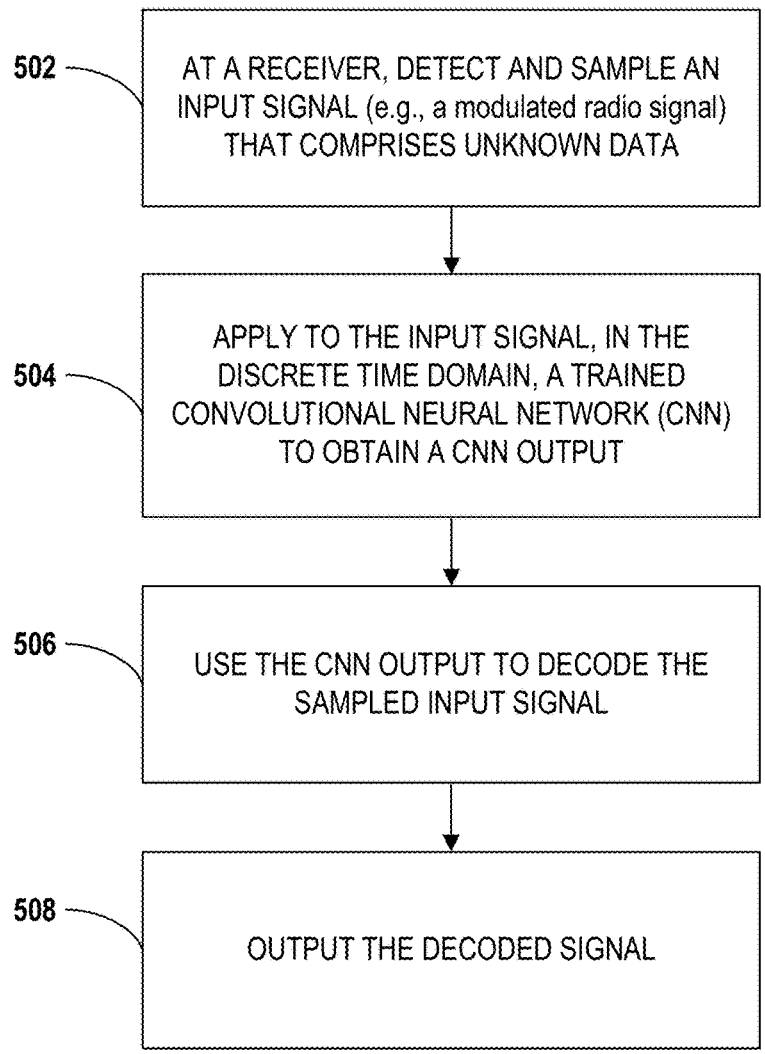
FIG. 5A is a flowchart that illustrates an exemplary process for decoding receiver signals according to embodiments of the present disclosure.

FIG. 5A is a flowchart that illustrates an exemplary process for decoding receiver signals according to embodiments of the present disclosure. In embodiments, process 500 begins at step 502 when an input signal is received at a receiver, e.g., a universal receiver that comprises a decoder. The input signal, which may be a modulated radio signal that comprises previously unknown data, may be detected and sampled using any known sampling techniques in the art.

At step 504, a CNN that comprises one or more layers with CNN kernels is applied to the sampled input signal, e.g., in the discrete time domain, in order to convolve the input signal with the CNN such as to obtain a convolved CNN output signal.

At step 506, the convolved signal may be used to decode the sampled input signal.

Finally, at step 508, the decoded signal may be output.

Figure 5B:
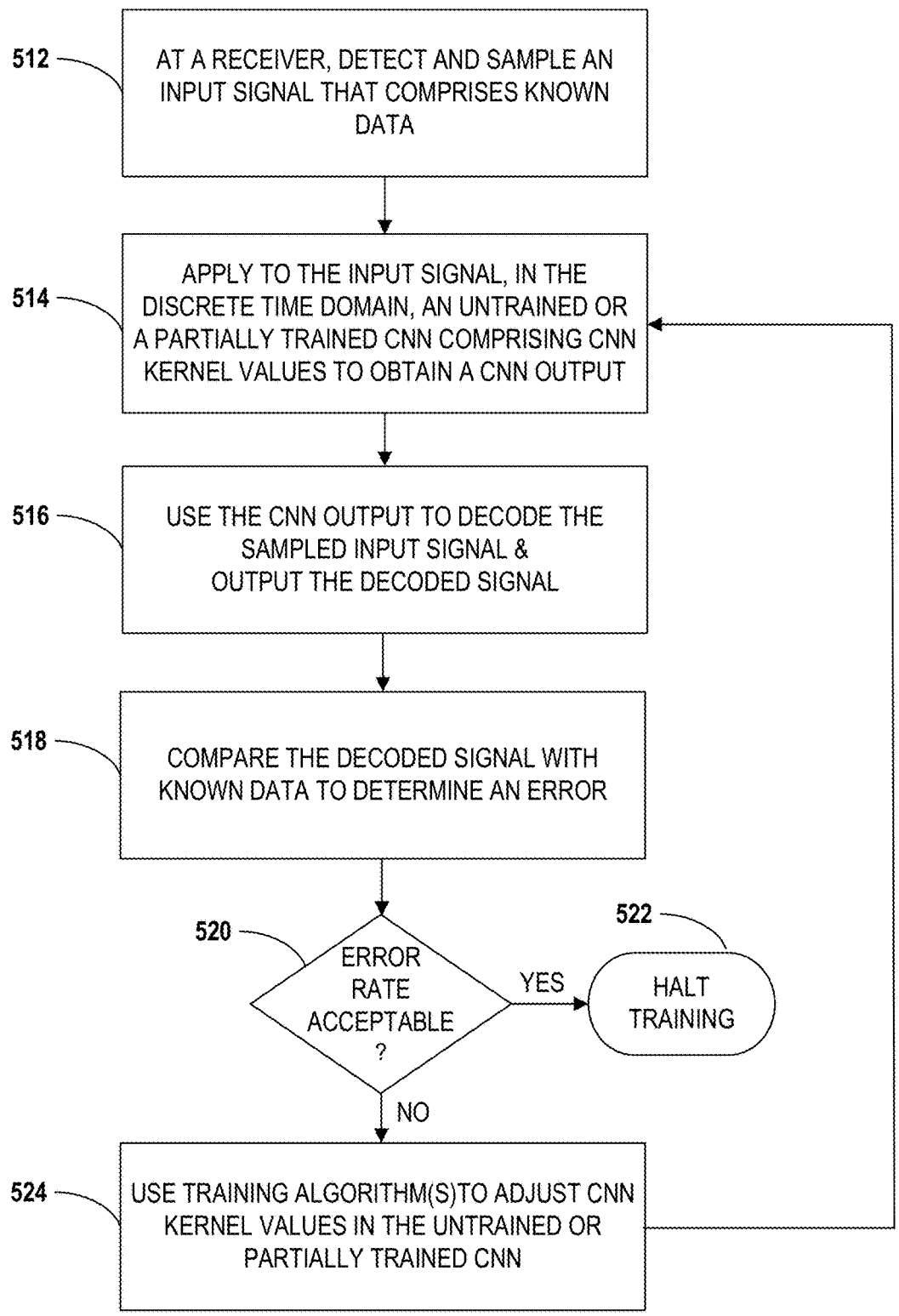
FIG. 5B is a flowchart illustrating an exemplary process for training a CNN-based demodulator/decoder system according to embodiments of the present disclosure.

FIG. 5B is a flowchart illustrating an exemplary process for training a CNN-based demodulator/decoder system according to embodiments of the present disclosure. Process 510 begins at step 512 when an input signal that comprises known, labeled data is detected at a receiver.

At step 514, an untrained or only partially trained CNN that comprises certain CNN kernels values is applied to the received input signal to convolve the input signal with the CNN kernels to obtain a convolved CNN output signal.

At step 516, the CNN output signal may be used to decode the sampled input signal that is then output.

At step 518, the decoded signal may be compared to known data to determine an error.

If, at step 520, the error meets a predetermined threshold, training is halted at step 522.

Otherwise, if the error fails to satisfy the threshold, one of one or more training algorithms may be used to adjust the CNN kernel values in the CNN, and process 510 may resume with step 514 by applying the adjusted CNN kernel(s) to the input signal to decode the input signal.

FIG. 6 illustrates preprocessing of frame detection followed by CNN-based demodulation/decoding according to embodiments of the present disclosure. In embodiments, in a preprocessing step, input signal 602 may be preprocessed to detect frame 604, e.g., the start of the frame (SOF) and the end of the frame (EOF) by any frame detection process known in the art. However, it is understood that such preprocessing step may equally be performed involving the CNN network itself.

In embodiments, frame 604, which is shown in exploded view as waveform 606, may then serve as the portion of input signal 602 that is used as the input to the CNN network and may then undergo a demodulation/decoding process according to embodiments of the present disclosure, e.g., according to FIG. 5B by undergoing forward propagation through a trained CNN to generate an output 610 that comprise zeroes and ones. It is noted that output 608 comprises a preamble of ones.

Figure 7:
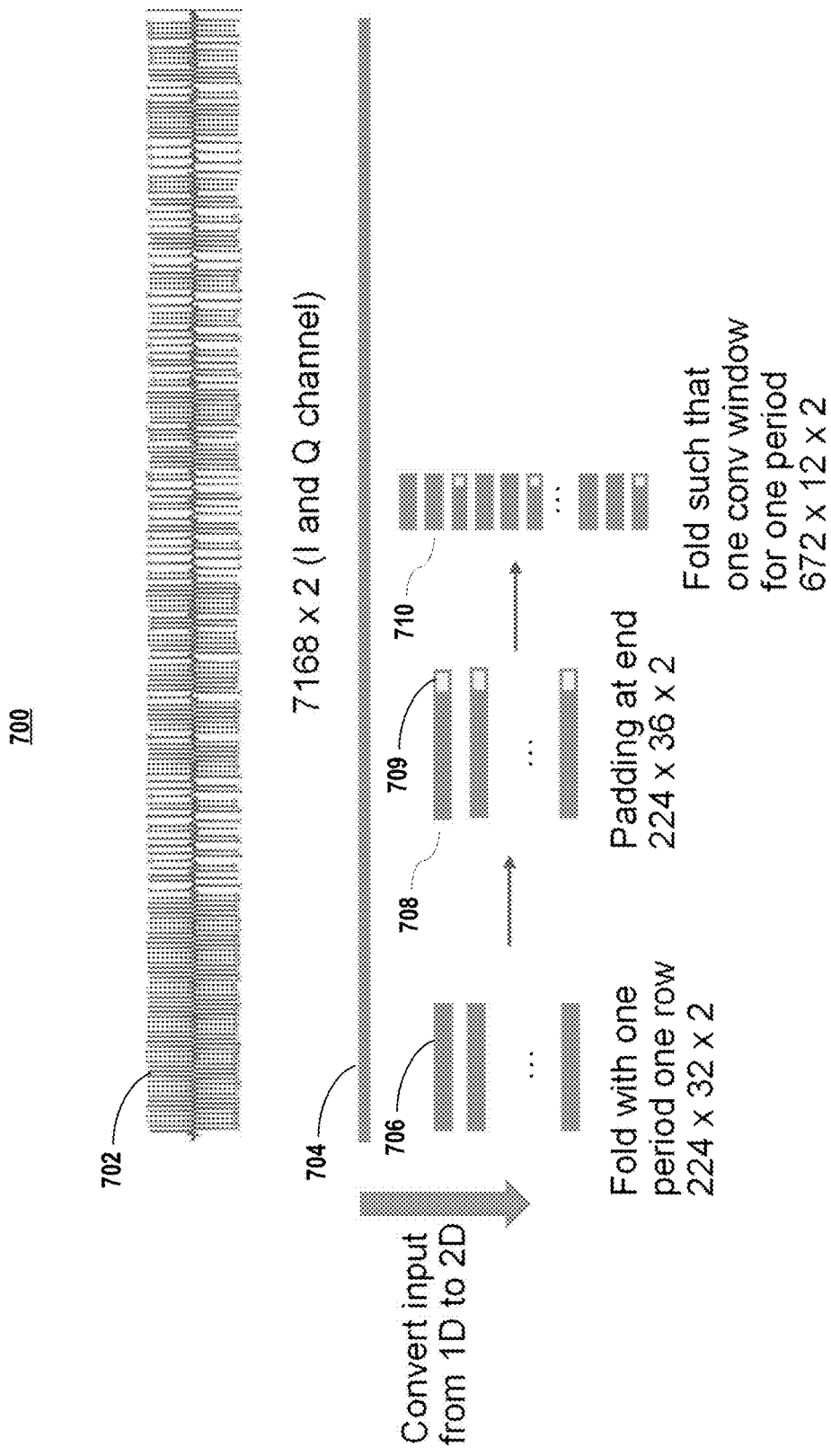
FIG. 7 and FIG. 8 illustrate demodulation/decoding for a 2D 2-layer CNN according to embodiments of the present disclosure.
Figure 8:
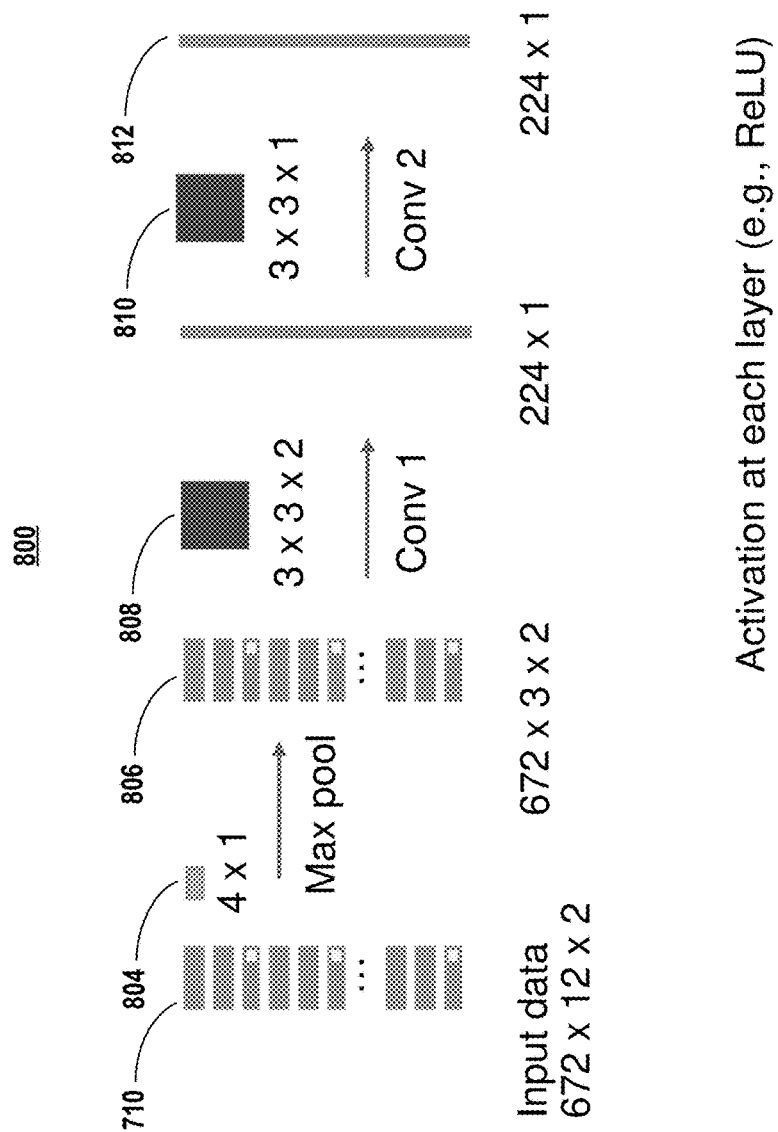

FIG. 7 and FIG. 8 illustrate demodulation/decoding for a 2D 2-layer CNN according to embodiments of the present disclosure. As shown in FIG. 7, there are 7168 sample points 704 that are used for each channel, here two radio channels, quadrature components I and Q generated by a mixer. In embodiments, sample points 704, which may be a 1D signal sequence, are converted from a 1D format to a 2D format, e.g., by the previously mentioned folding process, to obtain a multi-dimensional structure. This structure may be a matrix or stack that may be appropriately padded 708 with zeroes 709 at the end. In embodiments, prior to undergoing pooling, padded 708 structure may be again folded 710 to match the data period with convolution window size, here, a 3×3=9.

As shown in FIG. 8, max pooling may be used to downsample input data 710 to a reduced size 806, here by a factor of 4, prior to applying first convolution layer 808 and second convolution layer 810. Each convolution layer may have its own activation layer.

The number of output data points in this example is 224, i.e., the process yields 224 data points with zeroes and ones.

Figure 9:
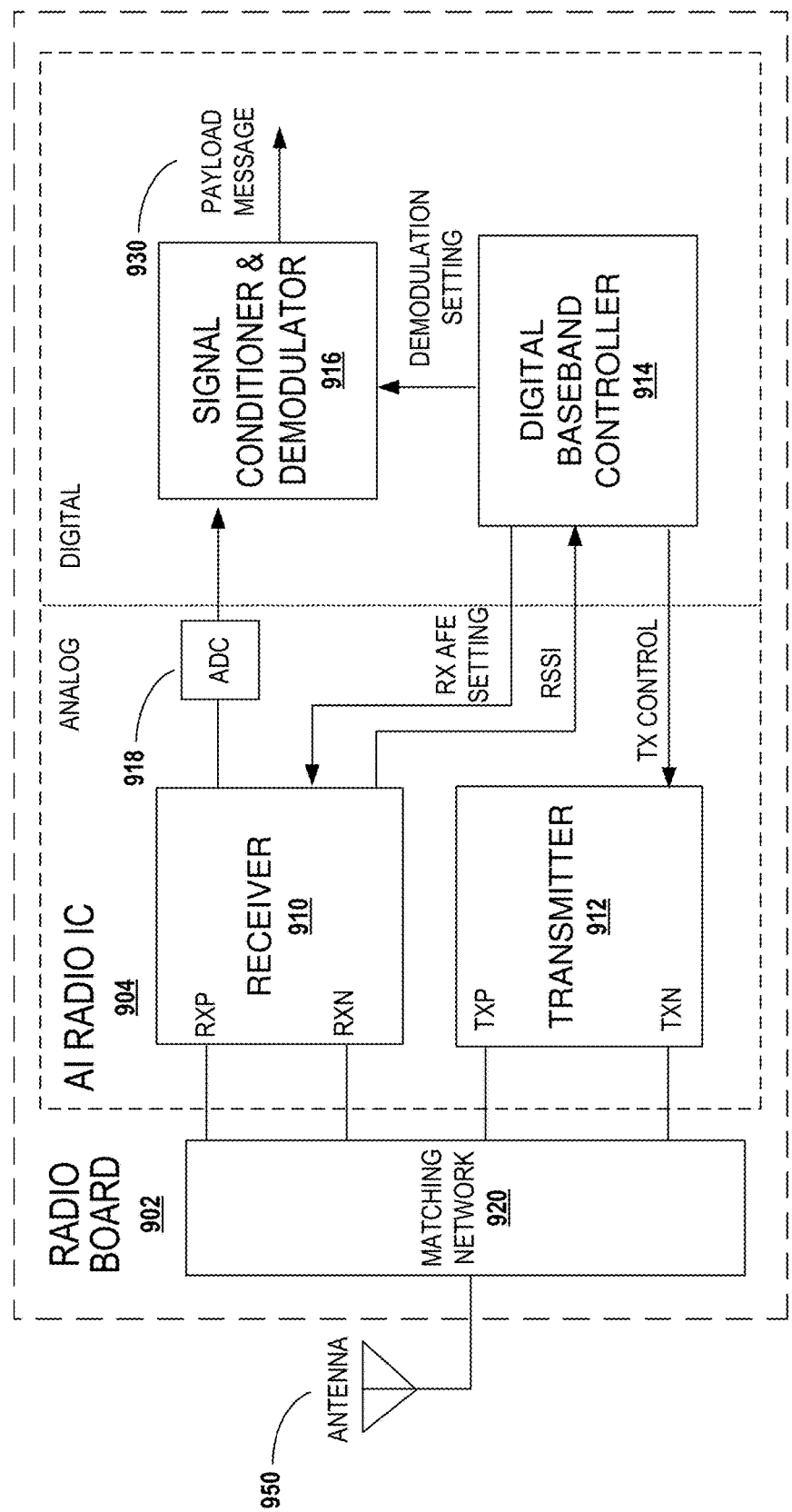
FIG. 9 illustrates and exemplary trainable radio according to embodiments of the present disclosure.

FIG. 9 illustrates and exemplary trainable radio according to embodiments of the present disclosure. AI radio 900 comprises radio board 902 may comprise matching network 920 that may couple to antenna 950, and AI radio integrated circuit (IC) 904. In embodiments, AI radio IC 904 may comprise analog receiver 910 and transmitter 912, and analog-to-digital converter 918. AI radio IC 904 may comprise circuit components that may be implemented as digital components, such as signal conditioner and demodulator 916 and digital baseband controller 914.

In embodiments, receiver 910 may comprise communication modules, e.g., low-noise amplifiers, mixers, hardware accelerators that may perform processing-intensive tasks, filters, and analog-to-digital converter (ADC) 918 that, in operation, may perform analog RF front-end processing steps on the signals in a receive path that comprises antenna 950, such as converting the analog RF signals received from matching network 920 into a discrete time domain signal at baseband. In embodiments, AI radio 900 may receive, at antenna 950, an analog RF signal that may pass any matching network 902 to match an output impedance of antenna 950 to an input impedance of use AI radio 900 to reduce unwanted standing-wave effects that may adversely impact efficiency and signal integrity. Receiver 910 may preprocess the received analog signal that may comprise information, e.g., in a number of data frames that each comprise a set of analog waveforms, prior to passing the signal to ADC 918. In embodiments, ADC 918 converts a set of analog waveforms that may correspond to a sequence of random bits into a discrete time domain signal to obtain a set of digital waveforms.

In embodiments, ADC 918 passes the set of digital waveforms to signal conditioner and demodulator 916 that may compromise a number of components (not shown), such as digital signal processing components, that process the output of ADC 918. For example, in embodiments, signal conditioner and demodulator 916 may comprise a buffer that buffers the discrete time domain signal, e.g., according to a first spreading ratio; a synchronization module that, in response to obtaining the discrete time domain signal from the buffer, detects a start-of-frame condition and determines a timing offset to synchronize the set of digital waveforms. In embodiments, the synchronization module may be implemented as a CNN that detects the start-of-frame condition.

In embodiments, signal conditioner and demodulator 916 may further comprise a downsampler or downconverter that uses the buffer output to downsample the discrete time domain signal e.g., according to the timing offset, to output downsampled data; a demodulator, e.g., an RF IQ demodulator that comprises a CNN that, in response to receiving the downsampled data and one or more demodulation setting from digital baseband controller 914, convolves the downsampled data with a kernel to detect and output a set of symbols. In embodiments, the demodulator may detect the set of symbols by using a neural network that may have been trained by using a labeled training data set. The labeled training data set may have been generated by using labeled training data according to various embodiments presented herein.

In embodiments, the demodulator may perform processing on digital baseband samples, such as frequency/time synchronization or rate matching, error detection, forward and backward error correction, and channel decoding/demodulation. In embodiments, signal conditioner and demodulator 916 may utilize one or more radio access protocols mentioned previously and a second buffer that applies a second spreading ratio to the set of symbols.

In embodiments, signal conditioner and demodulator 916 may comprise a decoder, which may be implemented as a CNN that detects an end-of-frame condition, may use the symbols to reconstruct a message that comprises the sequence of random bits.

In embodiments, digital baseband controller 914 may comprise a processor to control hardware and/or software processing components, e.g., to adjust the demodulation settings based on a received signal strength indicator (RSSI) signal that may be provided by receiver 910. Digital baseband controller 914 may provide analog RF front-end settings to receiver 910 and may send control signals and digital data streams to transmitter 912, e.g., after performing transmit processing.

In embodiments, processing may comprise error detection and forward error correction, channel coding and interleaving, channel modulation and mapping, rate matching, and power control functions to produce digital baseband samples. Although not shown, transmitter 912 may comprise analog and/or digital transmission components, such as power amplifiers, filters, mixers, digital-to-analog converters (DACs), processors, RF modulators, and other communication modules, e.g., to mix digital baseband samples to generate analog RF signals. In embodiments, in response to receiving the digital baseband samples, transmitter 912 may perform analog front-end processing to generate the analog RF signals for wireless transmission by antenna 950.

Figure 10:
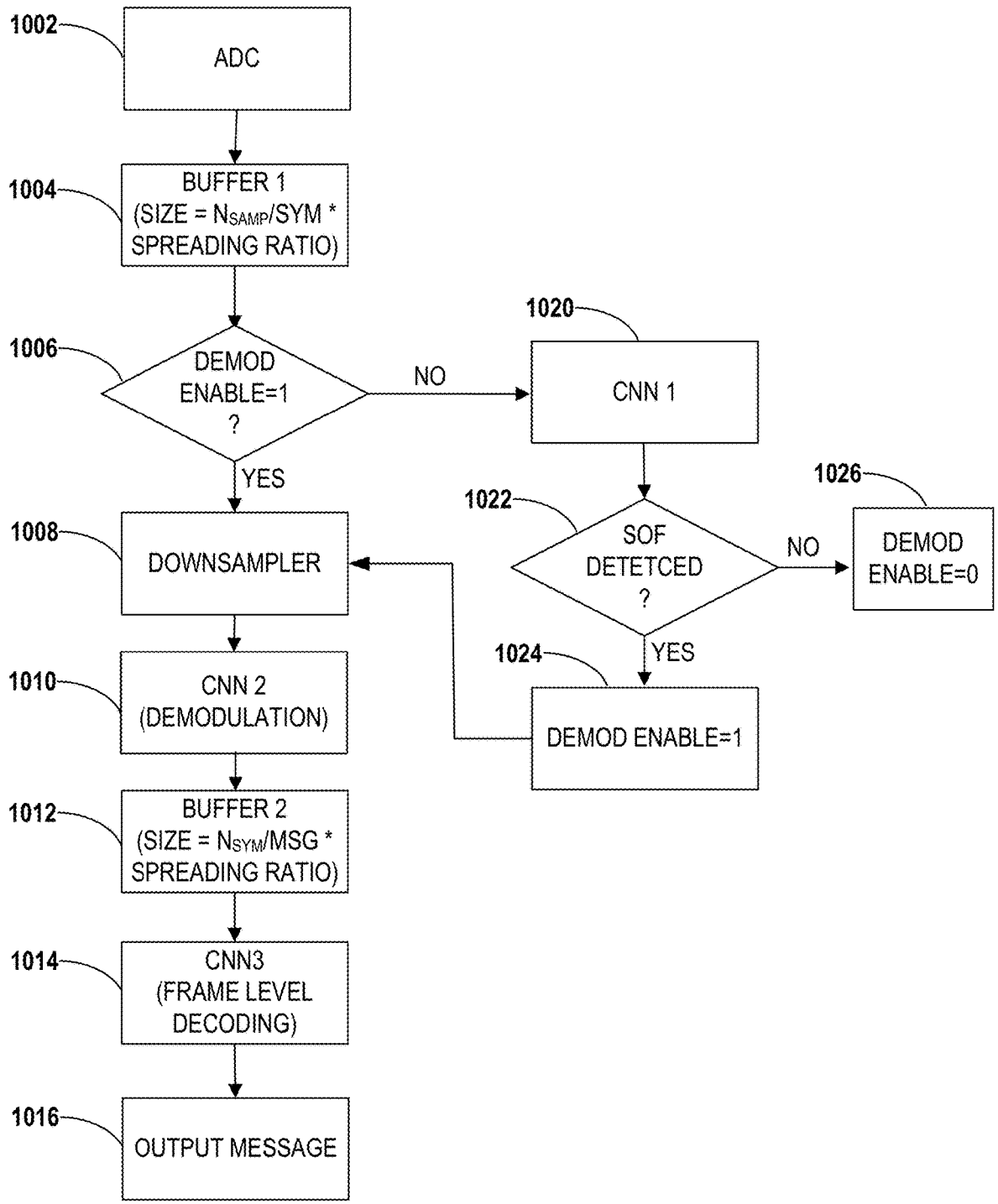
FIG. 10 is a flowchart that illustrates an exemplary process for training a trainable radio according to embodiments of the present disclosure.

FIG. 10 is a flowchart that illustrates an exemplary process for training a trainable radio according to embodiments of the present disclosure. Process 1000 for training may begin at step 1002 when an analog-to-digital converter (ADC) converts an analog signal that may have been at an antenna into a discrete time domain signal. The analog signal may comprise a set of analog waveforms that correspond to a sequence of random bits, such that the ADC outputs a set of digital waveforms.

In embodiments, at step 1004, the ADC output may be stored in a buffer whose size equals a number of samples per symbol multiplied by a spreading ratio.

If, at step 1006, it is determined that demodulation has been enabled, the buffered signal may be downsampled, at step 1008, before, at step 1010, it is fed into CNN 2 that serves as a demodulator that outputs decoded symbols, e.g., based on a set of demodulation setting. Otherwise, the buffer output may, at step 1020, be fed into CNN 1 or a synchronization module to detect a start-of-frame condition and synchronize the set of digital waveforms. Then, at step 1022, it may be determined whether a start-of-frame condition has been detected. If so, demodulation may be enabled, at step 1024, and process 1000 may resume with step 1008, e.g., using a timing offset that may have been determined by CNN 1; otherwise, at step 1026, demodulation may be disabled.

At step 1012, the decoded symbols output by CNN 2 may be buffered, e.g., in a buffer whose size equals a number of samples per message multiplied by a spreading ratio.

At step 1014, the buffered decoded symbols may be fed into CNN 3, e.g., for frame level decoding.

At step 1016, CNN 3 may, based on the decoded symbols, reconstruct and output a message that comprises the sequence of random bits.

It shall be noted that herein certain steps (1) may optionally be performed; (2) may not be limited to the specific order set forth herein; (3) may be performed in different orders; and (4) may be performed concurrently.

Figure 11:
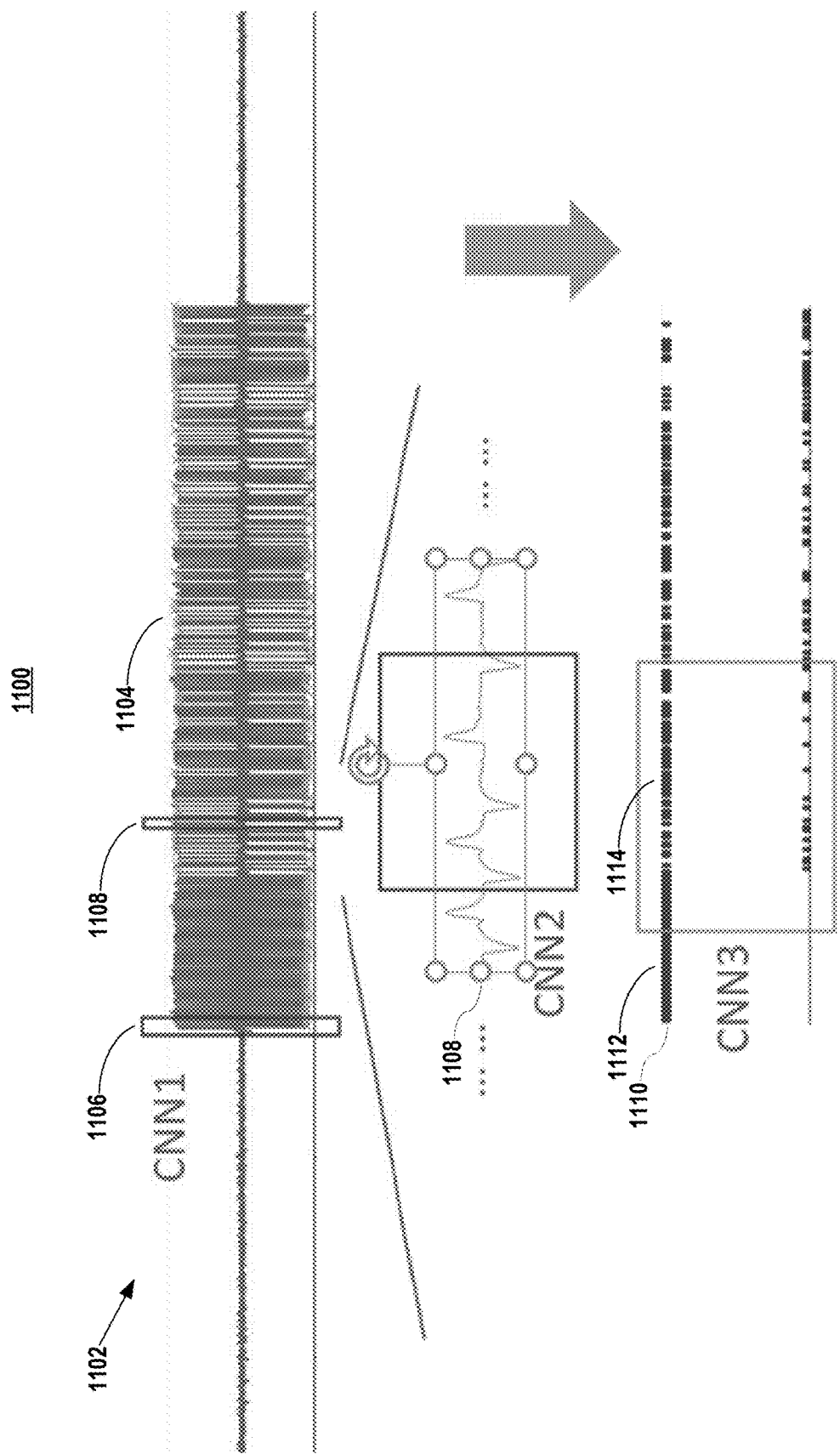
FIG. 11 illustrates processing of a frame by a set of CNNs according to embodiments of the present disclosure.

FIG. 11 illustrates processing of a frame by a set of CNNs according to embodiments of the present disclosure. As depicted in FIG. 11, in embodiments, CNN1 may be used to detect input signal 1102 that may correspond to any number of to-be-decoded symbols. Input 1102 may be provided by an analog-to-digital converter (ADC) and buffered according to a spreading ratio as discussed with reference to FIG. 9. In embodiments, CNN1 may process, e.g., in a preprocessing step, buffered input signal 1102 such as to detect start of frame 1106 to time-synchronize frame 1104. It is understood that one or more of the functions of CNN1 may equally be performed by using a digital circuit (not shown in FIG. 11).

Once frame 1104 has been detected and synchronized, it may serve as an input signal to CNN2. In embodiments, CNN2 may have been trained to apply a demodulation/decoding process on waveform 1108 (shown in exploded view as raw waveform 1108 in FIG. 11) to distinguish received data according to embodiments of the present disclosure, e.g., according to FIG. 5B. For example, CNN2 may generate output signal 1110 comprising zeroes and ones 1114 (and preamble 1112 comprising a series of ones) corresponding to decoded symbols, e.g., based on 4000 samples per symbol. In embodiments, the decoded/demodulated symbols may be buffered before being provided to CNN3 to undergo frame level decoding. Finally, CNN3 may output a payload message based on the decoded/demodulated symbols and perform regular radio operations at the inference stage.

Figure 12:
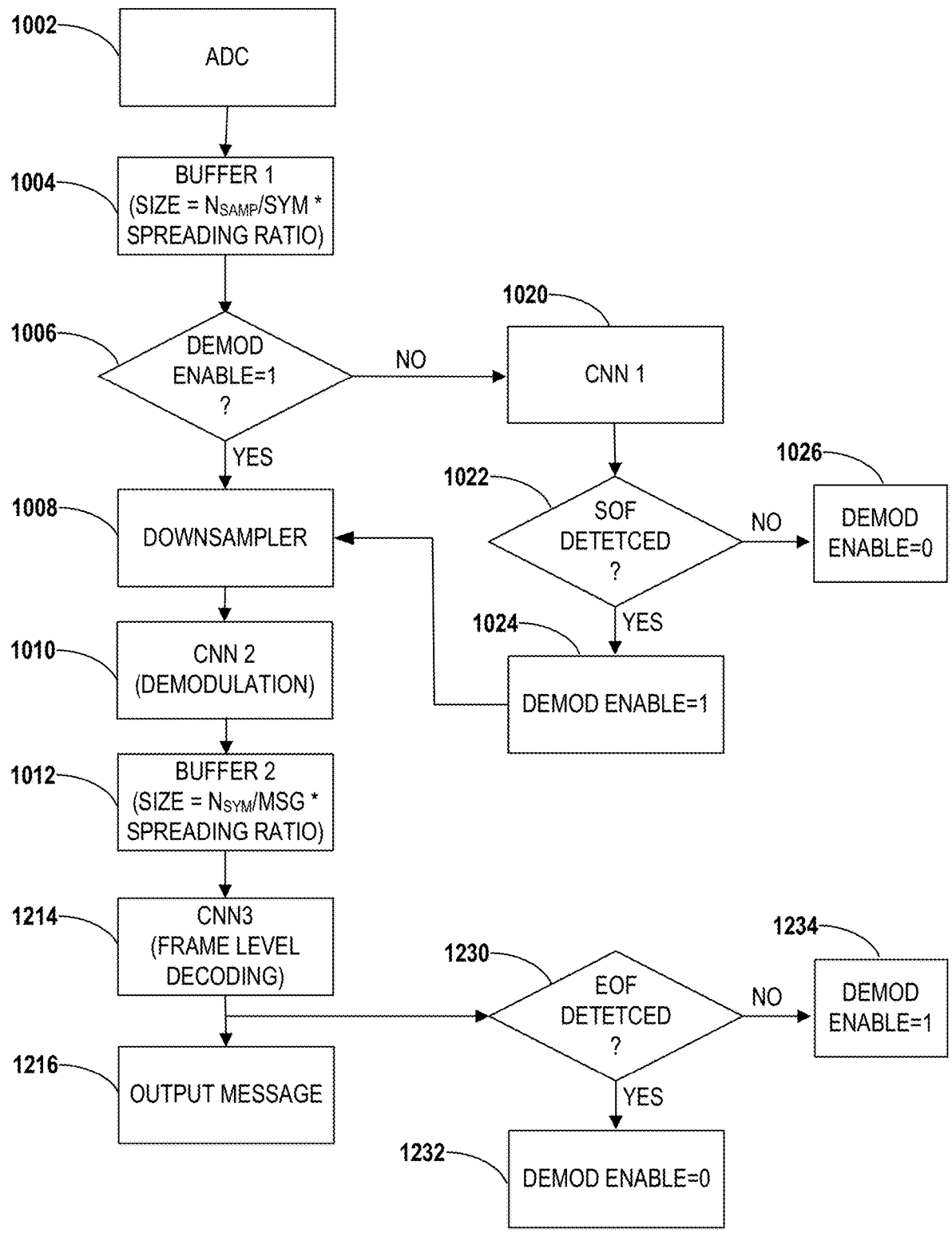
FIG. 12 is a flowchart that illustrates an alternative process for training a trainable radio according to embodiments of the present disclosure.

FIG. 12 is a flowchart that illustrates an alternative process for training a trainable radio according to embodiments of the present disclosure.

For clarity, steps similar to those shown in FIG. 10 are labeled in the same manner. For purposes of brevity, a description or their function is not repeated here.

In a manner similar to FIG. 10, process 1200 in FIG. 12 may utilize one or more CNNs. The main difference in this embodiment is that, in embodiments, instead of using the buffered decoded symbols to determine whether an end-of frame condition has been detected, message level information may be used. In particular, the output of CNN 3 may be used to determine, at step 1230, whether end-of frame condition has been detected, and if so, demodulation may be enabled at step 1234; otherwise, at step 1232, demodulation may be disabled.

Figure 13:
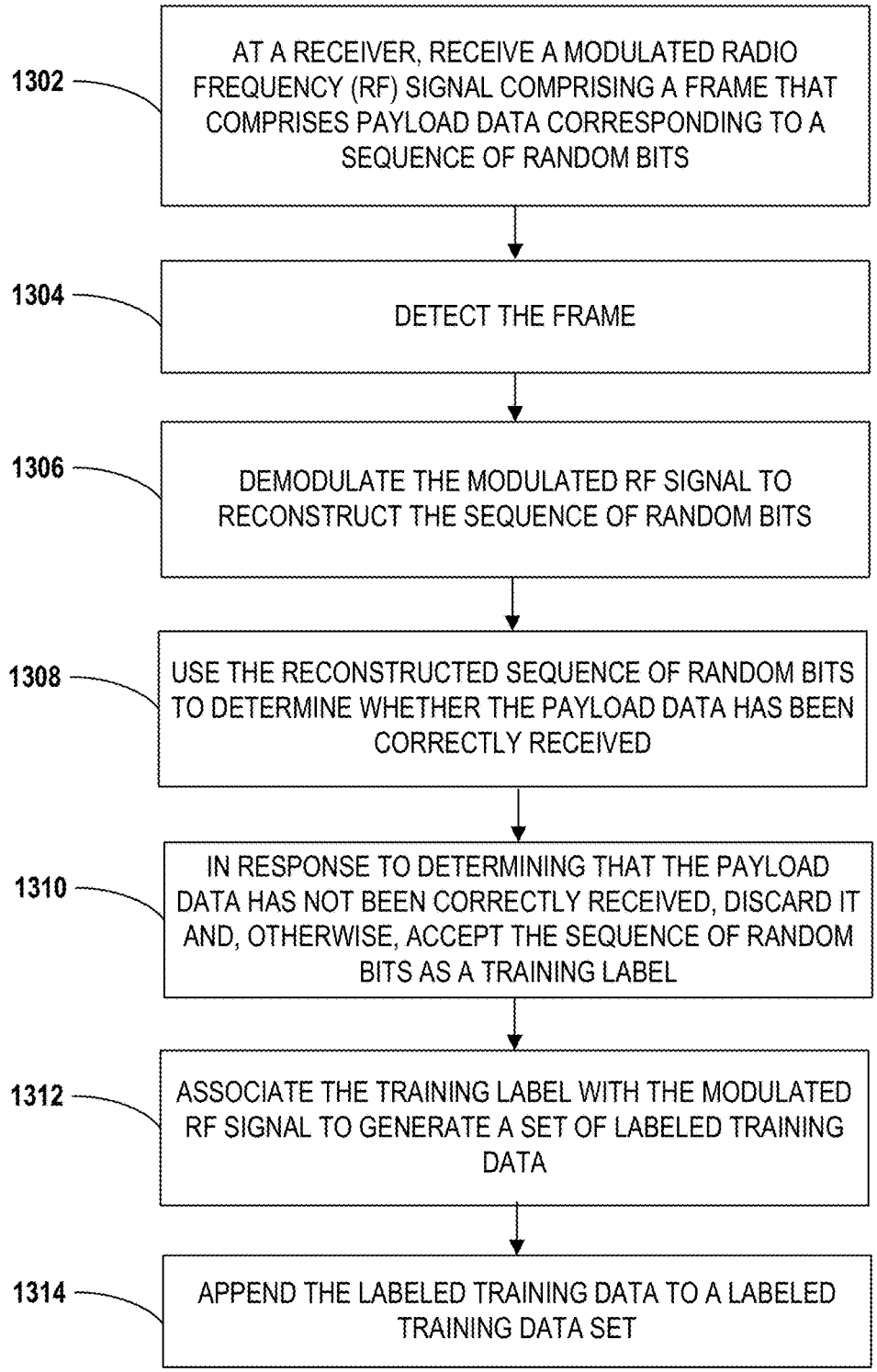
FIG. 13 is a flowchart that illustrates an exemplary process for automatically creating and labeling training data for a trainable radio according to embodiments of the present disclosure.

FIG. 13 is a flowchart that illustrates an exemplary process for automatically creating and labeling training data for a trainable radio according to embodiments of the present disclosure. In embodiment, process 1300 may begin at step 1302 when, at a receiver, a frame signal that comprises a modulated RF signal is received, e.g., from a transmitter. The receiver and transmitter may represent the distinct, non-shared hosts that may communicate with each other over, e.g., a wireless communication channel to generate the training data.

The modulated RF signal may comprise a set of waveforms that correspond to payload data that comprises a sequence of random bits. In embodiments, the RF signal may further comprise a preamble that comprises a sequence of symbols. In embodiments, the transmitter may generate the RF signal by using an RF modulator that modulates the preamble or the sequence of random bits into an analog RF signal.

At step 1304, the frame may be detected, e.g., by detecting a start-of-frame condition and/or an end-of-frame condition. The frame may comprise a continuous waveform that corresponds to a number of symbols. In embodiments, frame detection may comprise stripping off the preamble.

At step 1306, the modulated RF signal may be demodulated to reconstruct the sequence of random bits.

At step 1308, the reconstructed sequence may be used to determine whether the payload data has been correctly received. In embodiments, the modulated RF signal may comprise a set of error detection bits, e.g., a CRC bit that may be used to determine whether the payload data has been correctly received.

At step 1310, in response to determining that the payload data has not been correctly received, e.g., based on an accuracy check of the CRC, it may be discarded. Otherwise, the sequence of random bits may be assumed to be correct and, thus, be accepted as a training label.

At step 1312, the training label may be associated with the modulated RF signal to generate labeled training data.

Finally, at step 1314, the labeled training data may be appended to a labeled training data set that may be stored, e.g., in rows in a database, for training a CNN that is to be used at inference.

In embodiments, the trainable radio may use the labeled training data to train weight functions that, at inference, may be used for demodulation. The originally trained weights may be adjusted to reduce errors (/loss function) when processing data that has not been specifically trained for.

In embodiments, weight functions may reused for a majority of layers in a CNN, adjusted, and then used to train on a sub-set of layers, e.g., the last two layer of the CNN, without the need to train all weights from scratch. In embodiments, this may be accomplished by feeding specific data into the CNN to enable recognition of the specific data.

Figure 14:
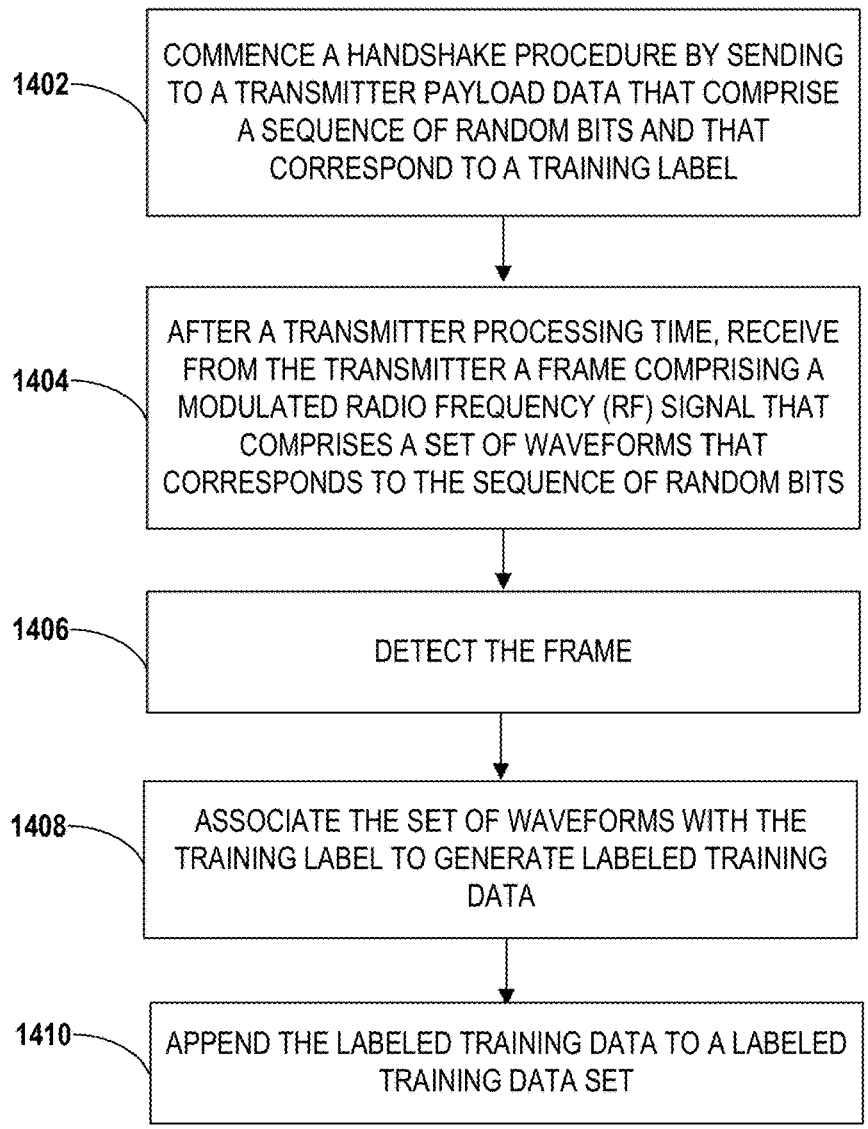
FIG. 14 is a flowchart that illustrates an exemplary handshake process for automatically creating and labeling training data for a trainable radio according to embodiments of the present disclosure.

FIG. 14 is a flowchart that illustrates an exemplary handshake process for automatically creating and labeling training data for a trainable radio according to embodiments of the present disclosure. Handshake process 1400 between a transmitter and a receiver may begin at step 1402, e.g., by commencing a handshake procedure by sending payload data from a receiver, e.g., via an internet connection, to a transmitter. In embodiments, the transmitter may fetch the payload data from a socket, e.g., according to a communication protocol, for example, telnet embedded into python machine learning platform. The payload data sent by the receiver may comprise a sequence of random bits and correspond to a training label or ground truth label.

At step 1404, e.g., after a transmitter processing time has elapsed, a frame that may comprise a modulated RF signal may be received from the transmitter, e.g., after the transmitter generates the signal using an RF modulator that modulates the sequence of random bits into an analog RF signal. In embodiments, the RF signal may comprise a set of waveforms that corresponds to the sequence of random bits.

At step 1406, a frame, which may comprise a continuous waveform that corresponds to a number of symbols, may be detected, e.g., by detecting a start-of-frame condition and/or an end-of-frame condition.

At step 1408, the set of waveforms may be associated with the training label to generate labeled training data, e.g., in a continuous fashion.

At step 1410, the labeled training data may be appended to a labeled training data set.

It is understood that although, here, it is the receiver that generates the ground truth, in embodiments, e.g., if a communication link is considered reliable, the transmitter may generate ground truth data and send it to the receiver.

In one or more embodiments, aspects of the present patent document may be directed to, may include, or may be implemented on one or more information handling systems (or computing systems). An information handling system/computing system may include any instrumentality or aggregate of instrumentalities operable to compute, calculate, determine, classify, process, transmit, receive, retrieve, originate, route, switch, store, display, communicate, manifest, detect, record, reproduce, handle, or utilize any form of information, intelligence, or data. For example, a computing system may be or may include a personal computer (e.g., laptop), tablet computer, mobile device (e.g., personal digital assistant (PDA), smart phone, etc.) smart watch, server (e.g., blade server or rack server), a network storage device, camera, or any other suitable device and may vary in size, shape, performance, functionality, and price. The computing system may include random access memory (RAM), one or more processing resources such as a central processing unit (CPU) or hardware or software control logic, ROM, and/or other types of memory. Additional components of the computing system may include one or more disk drives, one or more network ports for communicating with external devices as well as various input and output (I/O) devices, such as a keyboard, a mouse, touchscreen and/or a video display. The computing system may also include one or more buses operable to transmit communications between the various hardware components.

Figure 15:
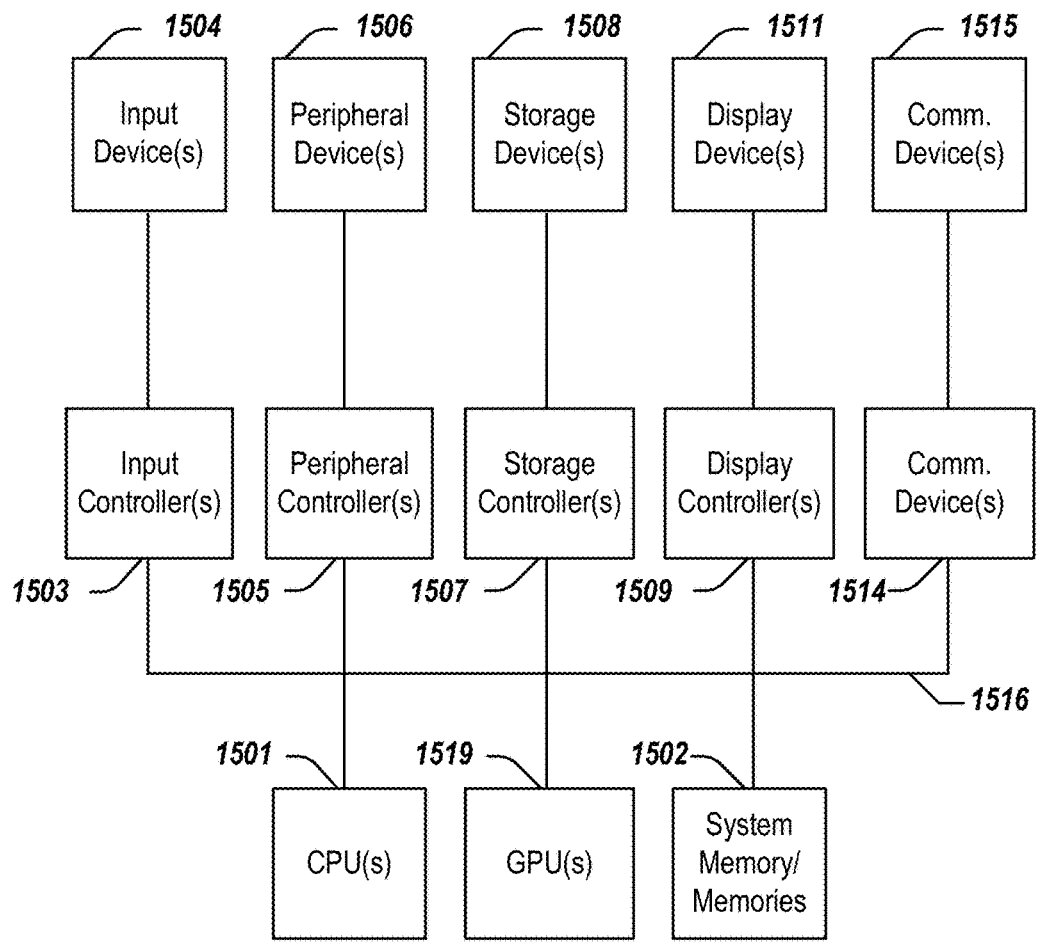
FIG. 15 depicts a simplified block diagram of an information handling system according to embodiments of the present invention.

FIG. 15 depicts a simplified block diagram of an information handling system (or computing system) according to embodiments of the present disclosure. It will be understood that the functionalities shown for system 1500 may operate to support various embodiments of a computing system—although it shall be understood that a computing system may be differently configured and include different components, including having fewer or more components as depicted in FIG. 15.

As illustrated in FIG. 15, the computing system 1500 includes one or more central processing units (CPU) 1501 that provides computing resources and controls the computer. CPU 1501 may be implemented with a microprocessor or the like, and may also include one or more graphics processing units (GPU) 1519 and/or a floating-point coprocessor for mathematical computations. System 1500 may also include a system memory 1502, which may be in the form of random-access memory (RAM), read-only memory (ROM), or both.

A number of controllers and peripheral devices may also be provided, as shown in FIG. 15. An input controller 1503 represents an interface to various input device(s) 1504, such as a keyboard, mouse, touchscreen, and/or stylus. The computing system 1500 may also include a storage controller 1507 for interfacing with one or more storage devices 1508 each of which includes a storage medium such as magnetic tape or disk, or an optical medium that might be used to record programs of instructions for operating systems, utilities, and applications, which may include embodiments of programs that implement various aspects of the present disclosure. Storage device(s) 1508 may also be used to store processed data or data to be processed in accordance with the disclosure. The system 1500 may also include a display controller 1509 for providing an interface to a display device 1511, which may be a cathode ray tube (CRT), a thin film transistor (TFT) display, organic light-emitting diode, electroluminescent panel, plasma panel, or other type of display. The computing system 1500 may also include one or more peripheral controllers or interfaces 1505 for one or more peripherals 1506. Examples of peripherals may include one or more printers, scanners, input devices, output devices, sensors, and the like. A communications controller 1514 may interface with one or more communication devices 1515, which enables the system 1500 to connect to remote devices through any of a variety of networks including the Internet, a cloud resource (e.g., an Ethernet cloud, a Fiber Channel over Ethernet (FCoE)/Data Center Bridging (DCB) cloud, etc.), a local area network (LAN), a wide area network (WAN), a storage area network (SAN) or through any suitable electromagnetic carrier signals including infrared signals.

In the illustrated system, all major system components may connect to a bus 1516, which may represent more than one physical bus. However, various system components may or may not be in physical proximity to one another. For example, input data and/or output data may be remotely transmitted from one physical location to another. In addition, programs that implement various aspects of the disclosure may be accessed from a remote location (e.g., a server) over a network. Such data and/or programs may be conveyed through any of a variety of machine-readable medium including, but are not limited to: magnetic media such as hard disks, floppy disks, and magnetic tape; optical media such as CD-ROMs and holographic devices; magneto-optical media; and hardware devices that are specially configured to store or to store and execute program code, such as application specific integrated circuits (ASICs), programmable logic devices (PLDs), flash memory devices, and ROM and RAM devices.

Aspects of the present disclosure may be encoded upon one or more non-transitory computer-readable media with instructions for one or more processors or processing units to cause steps to be performed. It shall be noted that the one or more non-transitory computer-readable media shall include volatile and non-volatile memory. It shall be noted that alternative implementations are possible, including a hardware implementation or a software/hardware implementation. Hardware-implemented functions may be realized using ASIC(s), programmable arrays, digital signal processing circuitry, or the like. Accordingly, the "means" terms in any claims are intended to cover both software and hardware implementations. Similarly, the term "computer-readable medium or media" as used herein includes software and/or hardware having a program of instructions embodied thereon, or a combination thereof. With these implementation alternatives in mind, it is to be understood that the figures and accompanying description provide the functional information one skilled in the art would require to write program code (i.e., software) and/or to fabricate circuits (i.e., hardware) to perform the processing required.

It shall be noted that embodiments of the present disclosure may further relate to computer products with a non-transitory, tangible computer-readable medium that have computer code thereon for performing various computer-implemented operations. The media and computer code may be those specially designed and constructed for the purposes of the present disclosure, or they may be of the kind known or available to those having skill in the relevant arts. Examples of tangible computer-readable media include, but are not limited to: magnetic media such as hard disks, floppy disks, and magnetic tape; optical media such as CD-ROMs and holographic devices; magneto-optical media; and hardware devices that are specially configured to store or to store and execute program code, such as application specific integrated circuits (ASICs), programmable logic devices (PLDs), flash memory devices, and ROM and RAM devices. Examples of computer code include machine code, such as produced by a compiler, and files containing higher level code that are executed by a computer using an interpreter. Embodiments of the present disclosure may be implemented in whole or in part as machine-executable instructions that may be in program modules that are executed by a processing device. Examples of program modules include libraries, programs, routines, objects, components, and data structures. In distributed computing environments, program modules may be physically located in settings that are local, remote, or both.

One skilled in the art will recognize no computing system or programming language is critical to the practice of the present disclosure. One skilled in the art will also recognize that a number of the elements described above may be physically and/or functionally separated into sub-modules or combined together.

It will be appreciated to those skilled in the art that the preceding examples and embodiments are exemplary and not limiting to the scope of the present disclosure. It is intended that all permutations, enhancements, equivalents, combinations, and improvements thereto that are apparent to those skilled in the art upon a reading of the specification and a study of the drawings are included within the true spirit and scope of the present disclosure. It shall also be noted that elements of any claims may be arranged differently including having multiple dependencies, configurations, and combinations.

What is claimed is:

1. A system for training a training-based radio, the system comprising:
   an analog-to-digital converter (ADC) that converts a frame that comprises a set of waveforms corresponding to a sequence of random bits into a discrete time domain signal;
   a first buffer that buffers the discrete time domain signal according to a first spreading ratio;
   a synchronization module that, in response to obtaining the discrete time domain signal from the first buffer, detects a start-of-frame condition and determines a timing offset to synchronize the set of waveforms;
   a downsampler that uses the timing offset to downsample the discrete time domain signal to output downsampled data;
   a demodulator comprising a convolutional neural network (CNN) that, in response to receiving the downsampled data, convolves the downsampled data with a kernel to detect and output a set of symbols;
   a second buffer that applies a second spreading ratio to the set of symbols; and
   a decoder that uses the set of symbols to reconstruct a message that comprises the sequence of random bits.

2. The method according to claim 1, wherein the decoder detects an end-of-frame condition.

3. The method according to claim 1, wherein the demodulator detects the set of symbols by using a labeled training data set.

4. The method according to claim 3, wherein the demodulator comprises a neural network that has been trained by performing steps comprising:
   sending payload data to a transmitter, the payload data comprising a training label;
   after a transmitter processing time, receiving at a receiver a modulated radio frequency (RF) signal; and
   until a stopping condition is met detecting the modulated RF signal and associating it with the training label to generate labeled training data; and
   using the labeled training data to generate the labeled training data set.

5. The method according to claim 4, wherein the steps further comprise commencing a handshake procedure between the receiver and the transmitter to ensure that the payload data corresponds to a ground truth label.

6. The method according to claim 4, further comprising using the labeled training data set to train weight functions and using the weight functions to demodulate the modulated RF signal.

\* \* \* \* \*